(12) United States Patent
Stankovich et al.

(10) Patent No.: US 7,914,844 B2
(45) Date of Patent: Mar. 29, 2011

(54) STABLE DISPERSIONS OF POLYMER-COATED GRAPHITIC NANOPLATELETS

(75) Inventors: Sasha Stankovich, Chicago, IL (US); Sonbinh T. Nguyen, Evanston, IL (US); Rodney S. Ruoff, Skokie, IL (US)

(73) Assignee: Northwestern University, Evanston, IL (US)

( * ) Notice: Subject to any disclaimer, the term of this patent is extended or adjusted under 35 U.S.C. 154(b) by 374 days.

(21) Appl. No.: 11/600,679

(22) Filed: Nov. 16, 2006

(65) Prior Publication Data

US 2007/0131915 A1 Jun. 14, 2007

Related U.S. Application Data

(60) Provisional application No. 60/738,334, filed on Nov. 18, 2005.

(51) Int. Cl.
*B05D 5/12* (2006.01)
*H01B 1/04* (2006.01)
*H01B 1/06* (2006.01)
*C08G 50/59* (2006.01)
*C08G 63/66* (2006.01)

(52) U.S. Cl. .......... 427/58; 427/180; 252/502; 252/511; 528/123; 528/361

(58) Field of Classification Search .................. 252/500, 252/502; 427/58, 180; 428/408, 336; 423/448; 525/504; 528/111, 121, 123, 361, 362, 365, 528/369, 370, 393, 407, 93
See application file for complete search history.

(56) References Cited

U.S. PATENT DOCUMENTS

2002/0107340 A1* 8/2002 Matyjaszewski et al. ...... 526/91
2003/0224168 A1* 12/2003 Mack et al. .................... 428/408
2005/0077503 A1* 4/2005 Gotou et al. .................. 252/502

OTHER PUBLICATIONS

Fukushima, A carbon Nanotube Alternative; Graphite Nanoplatelets as Reinforcements for Polymers, 2003, ANTEC, 2230-2234.*
Heyong He, et al. "A new structural model for graphite oxide", 1998, pp. 53-56, Chemical Physics Letters 287.
Amy B. Pangborn, et al. "Safe and Convenient Procedure for Solvent Purification", 1996, pp. 1518-1520.
Christopher A Hunter, et al. "Aromatic interactions", 2001, pp. 651-669, Perkin Trans. 2.
G.I. Titelman, et al. "Characteristics and microstructure of aqueous colloidal dispersions of graphite oxide", 2005, pp. 641-649, Carbon 43.
Dennis E. Koppel, "Analysis of Macromolecular Polydispersity in Intensity Correlation Spectroscopy: The Method of Cumulants", 1972, pp. 4817-4820, J. Chem. Phys., vol. 57, No. 11.
Hiroyuki Fukushinma, et al. "A Carbon Nanotube Alternative: Graphite Nanoplatelets as Reinforcements for Polymers", 2003, pp. 2230-2234, MSU.
Athanasios B. Bourlinos, et al. Graphite Oxide: Chemical Reduction to Graphite and Surface Modification with Primary Aliphatic Amines and Amino Acids, 2003, pp. 6050-6055.
U. Hoffman, et al."Kolloid-Zeischrift", 1934, pp. 149-151.
U. Hoffman, et al. "Untersuchungen uber Graphitoxyd", 1937, pp. 311-336.
William S. Hummers, et al. "Preparation of Graphitic Oxide", 1958, pp. 1339.
L. Ibarra, "Effects of a Diazide as Adhesion Agent on Composite Materials Consisting of an Elastomeric Matrix and Short Polyester Fiber", 1993, pp. 1595-1601, J. of Applied Science, vol. 49.
R.J. Waltman, et al. "X-ray Photoelectron Spectroscopic Studies on Organic Photoconductors: etc..", 1993, pp. 1799-1804, American Chemical Society.
Heyong He, et al. "Solid-State NMR Studies of the Structure of Graphite Oxide", 1996, pp. 19954-19958. J. Phy. Chem.
Anton Lerf, et al. "Structure of Graphite Oxide Revisited", 1998, pp. 4477-4482, J. Phys Chem. B.
C. Hontoria-Lucas, et al. "Study of oxygen-containing groups in a series of graphite oxides: physical and chemical characterization", 1995, pp. 1585-1592, Carbon vol. 33, No. 11.
Pinggui Liu, et al. "Sythesis of polyaniline-intercalated graphite oxide by an in situ oxidative polymerization reaction", 1999, pp. 706-707, Carbon 37.
Masukazu Hirata, et al. "Thin-film of graphite oxide 2: etc..", 2005, pp. 503-510, Carbon 43.
Masuku Hirata, et al. "Thin-film particles of graphite oxide 1: high-yield synthesis and flexibility of the particles", 2004, pp. 2929-2937, Carbon 42.
N. Kovtyukhova, et al. "Ultrathin supported graphite oxide and carbon films", 1998, pp. 549-554, Carbon vol. 36, No. 5-6.
Valerie C. Moore, et al. "Individually suspended single-walled carbon nanotubes in various surfactants", 2003, pp. 1397-1382, vol. 3, No. 10.

* cited by examiner

*Primary Examiner* — Ling-Siu Choi
*Assistant Examiner* — Monique Peets

(57) ABSTRACT

A method of making a dispersion of reduced graphite oxide nanoplatelets involves providing a dispersion of graphite oxide nanoplatelets and reducing the graphite oxide nanoplatelets in the dispersion in the presence of a reducing agent and a polymer. The reduced graphite oxide nanoplatelets are reduced to an extent to provide a higher C/O ratio than graphite oxide. A stable dispersion having polymer-treated reduced graphite oxide nanoplatelets dispersed in a dispersing medium, such as water or organic liquid is provided. The polymer-treated, reduced graphite oxide nanoplatelets can be distributed in a polymer matrix to provide a composite material.

5 Claims, 7 Drawing Sheets

Binding Energy (eV)

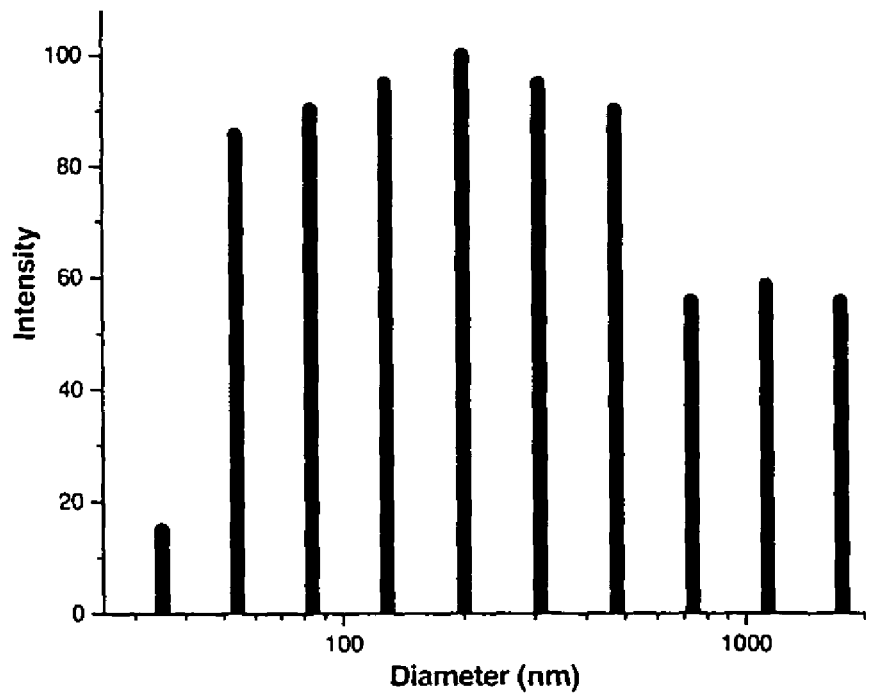
Fig. 6
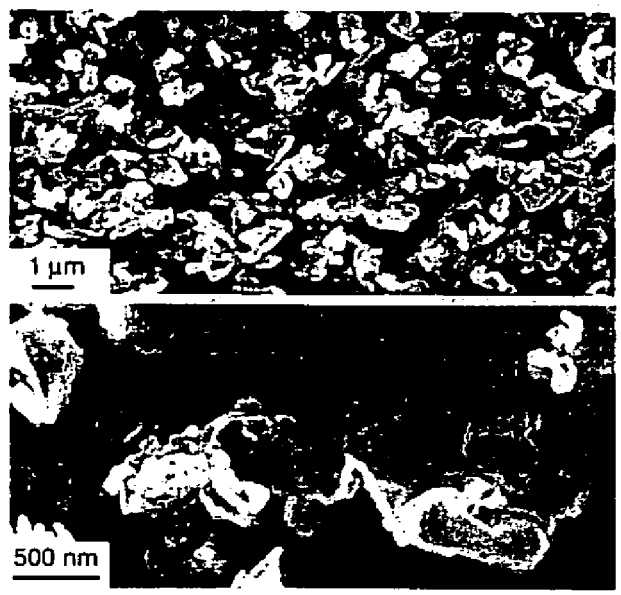
Fig. 7a
Fig. 7b

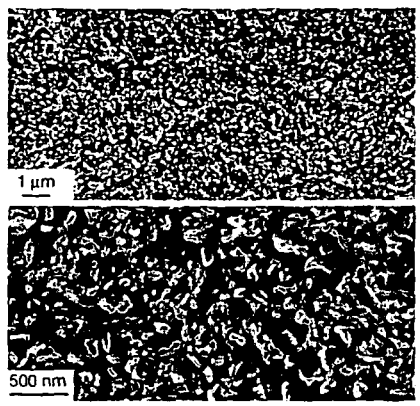
Fig. 7c
Fig. 7d
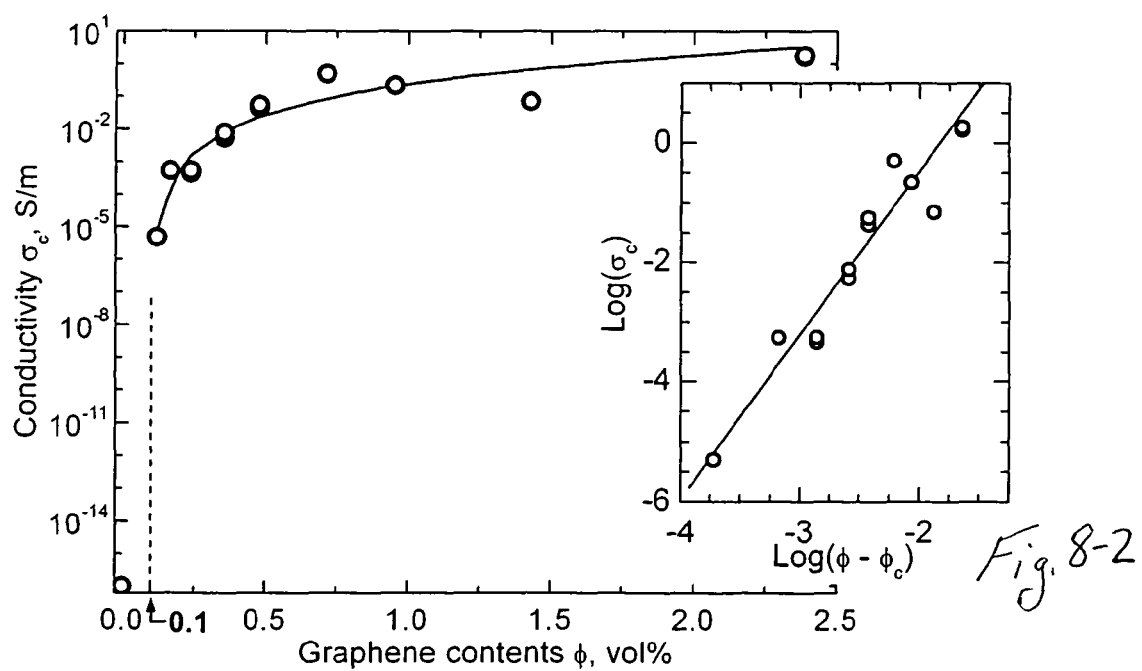
Fig. 8-1
Fig. 8-2

STABLE DISPERSIONS OF POLYMER-COATED GRAPHITIC NANOPLATELETS

RELATED APPLICATIONS

This application claims priority and benefits of U.S. provisional application Ser. No. 60/738,334 filed Nov. 18, 2005, the disclosure of which is incorporated herein by reference.

CONTRACTUAL ORIGIN OF THE INVENTION

This invention was supported in part by funding from the Federal Government through NASA under Grant/Contract No. NCC-1-02037 via the University Research, Engineering, and Technology Institute on Bio-inspired Materials. The Government may have certain rights in the invention.

FIELD OF THE INVENTION

The invention relates to a method of making a stable dispersion of polymer-coated reduced graphite oxide nanoplatelets and the resulting polymer-coated reduced graphite oxide nanoplatelets and stable dispersions thereof as well as composites incorporating the nanoplatelets.

BACKGROUND OF THE INVENTION

Graphite nanoplatelets have recently attracted considerable attention as a viable and inexpensive filler substitute for carbon nanotubes in nanocomposites, given the predicted excellent in-plane mechanical, structural, thermal, and electrical properties of graphite. Graphite nanoplatelets in the form of graphene sheets are now known and each comprises a one-atom thick, two dimensional layer of carbon atoms. Graphene layers or sheets are predicted to exhibit a range of possible advantageous properties such as high thermal conductivity, mechanical stiffness and electronic transport that rival the remarkable in-plane, like-properties of bulk graphite.

One possible route to harnessing these properties for potential applications would be to incorporate graphene sheets in a homogeneous distribution in a composite material. As with carbon nanotubes, however, utilization of graphite nanoplatelets in the form of graphene sheets in polymer nanocomposite applications and other applications will in all likelihood depend on the ability to achieve complete dispersion of the nanoplatelets in a solvent employed to dissolve polymers that eventually form a polymer matrix when the solvent is subsequently removed.

SUMMARY OF THE INVENTION

The invention envisions a method for making polymer-coated graphitic nanoplatelets by the chemical reduction of graphite oxide nanoplatelets in-situ in a dispersing medium in the presence of a reducing agent and a polymer.

To this end, one embodiment of the invention involves providing a dispersion of exfoliated graphite oxide nanoplatelets in a water dispersing medium and reducing the exfoliated graphite oxide nanoplatelets in the presence of a reducing agent and a polymer, such as preferably an amphiphilic polymer.

To this same end, another embodiment of the invention involves providing a dispersion of exfoliated isocyanate-treated graphite oxide nanoplatelets in an organic liquid dispersing medium and reducing the exfoliated isocyanate-treated graphite oxide nanoplatelets in the presence of a reducing agent and a polymer, such as a styrene-containing polymer.

In an illustrative embodiment of the invention, the graphite oxide nanoplatelets are reduced to an extent to have a greater C/O (carbon/oxygen) atomic ratio that the graphite oxide nanoplatelets. Preferably, the graphite oxide nanoplatelets are reduced to an extent to have a C/O (carbon/oxygen) atomic ratio of at least about 9. The reduced graphite oxide nanoplatelets preferably have a nano-thickness less than about 5 nm (nanometers).

The invention further envisions a reduced graphite oxide nanoplatelet treated with a polymer and stable dispersions thereof in water, organic, and other dispersing media.

The invention still further envisions a composite material comprising a matrix having reduced graphite oxide nanoplatelets treated with a polymer distributed in the matrix.

The above and other features and advantages of the invention will become more readily apparent from the following detailed description taken with the following drawings.

DESCRIPTION OF THE DRAWINGS

In FIG. 3a, each division on each axis is 1.0 μm/division, while in FIG. 3b each division on each axis is 0.20 μm/division.

FIG. 6 represents an anaylsis showing the intensity-weighted hydrodynamic diameter distribution of phenyl isocyanate-treated graphite oxide nanoplatelets exfoliated in DMF.

FIGS. 7a and 7b are SEM images at different magnifications of a fracture surface of a hot-pressed composite having 2.4 volume % loading of graphite in polystrene matrix, while FIGS. 7c and 7d are SEM images at different magnifications of a fracture surface of a hot-pressed composite having 0.48 volume % loading of graphite in polystrene matrix. The SEM image were obtianed from a fracture surface o the hot-pressed compsoite samples.

FIG. 8-1 is a graph of electrical conductivity of the polymer—graphene composites made pursuant to the invention as a function of filler (graphene) volume fraction. In the figure, the composite conductivity, $\sigma_c$, is plotted against filler-volume fraction. Solid line is a calculated conductivity based on fitting parameters obtained from experimental data (log-log plot of FIG. 8-2) and the effective conductivity equation set forth below. FIG. 8-2 is a plot of log($\Phi-\Phi_c$) versus log $\sigma_c$ where $\Phi$ is the filler volume fraction and $\Phi_c$ is the percolation threshold (the onset of the transition). Fitted parameters are: t=2.74±0.20; $\sigma_f$=10$^{4.92±0.52}$ S/m; $\Phi_c$=0.1 volume %.

DETAILED DESCRIPTION OF THE INVENTION

Figure 1A:
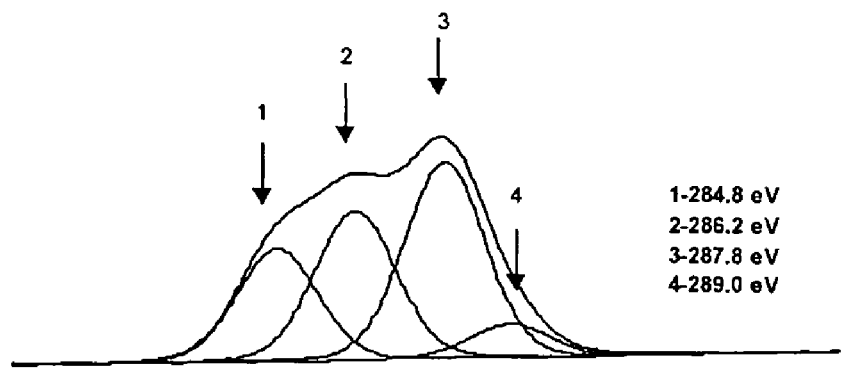
FIGS. 1a, 1b, and 1c are respective XPS spectra of graphite oxide nanoplatelets, uncoated reduced graphite oxide nanoplatelets, and PSS-coated reduced graphite oxide nanoplatelets made pursuant to an embodiment of the invention.

The invention provides a method for making polymer-coated graphitic platelets that include a graphite or graphite-like structure at one or more regions thereof or substantially throughout the platelet and have a nano-scale platelet thickness, such as a thickness less than about 5 nm. The graphitic nanoplatelets are made by the chemical reduction of graphite oxide nanoplatelets in-situ in a dispersing medium in the presence of a reducing agent and a polymer. The dispersing medium can comprise water, an organic liquid, or other suitable dispersing liquid.

One embodiment of the invention involves providing a dispersion of exfoliated graphite oxide nanoplatelets in a water dispersing medium and reducing the exfoliated graphite oxide nanoplatelets in the presence of a reducing agent and a polymer, such as preferably an amphiphilic polymer. Another embodiment of the invention involves providing a dispersion of exfoliated isocyanate-treated graphite oxide nanoplatelets in an organic liquid dispersing medium and reducing the exfoliated isocyanate-treated graphite oxide nanoplatelets in the presence of a reducing agent and a polymer, such as a styrene-containing polymer.

In an illustrative embodiment of the invention, the dispersion of graphite oxide nanoplatelets is formed by exfoliating graphite oxide nanoplatelets from bulk graphite oxide in water or organic liquid dispersing medium using ultrasonic energy.

For purposes of illustration and not limitation, bulk graphite oxide can be prepared using SP-1 bulk graphite from Bay Carbon, Bay City, Mich. In particular, the SP-1 graphite is subjected to an oxidative treatment with potassium permanganate ($KMnO_4$) in concentrated sulfuric acid. In particular, graphite (2 gm) was placed into a round bottom flask. Concentrated sulfuric acid (46 mL) was added and the mixture cooled in an ice bath. Potassium permanganate was added to the ice cooled mixture in small portions over 30 minutes. Following this addition, the reaction mixture was stirred at 35 degrees C. for 2 hours. After the two hour period, water (92 mL) was added to the reaction mixture and stirring continued for 15 minutes. Finally, the reaction mixture was poured into 270 mL of water and excess of potassium permanganate was neutralized by adding sufficient amount of water solution (30%) of hydrogen peroxide. Graphite oxide was recovered by filtration. The filtered graphite oxide was washed with an HCl solution (10:1 water:concentrated HCl) until sulfates are no longer detected by a barium chloride test. The graphite oxide was then dried under vacuum (30 mTor) for 24 hours. The oxidative treatment to produce graphite oxide is described by Hummers et al. in J. Am. Chem. Soc. 1958, 80, 1339, the teachings of which are incorporated herein by reference to this end.

The graphite oxide retains a layered structure similar to that of graphite, but is much lighter in color than graphite due to the loss of electronic conjugation brought about during oxidation thereof. For example, the basal planes of the graphene sheets in the graphite oxide are decorated mostly with epoxide and hydroxyl groups, in addition to carbonyl and carboxyl groups, which are located at the edges. These oxygen functionalities alter the van der Waals interactions between the layers of graphite oxide and render them hydrophilic, thus facilitating their hydration and exfoliation in aqueous media. As a result, graphite oxide readily forms stable colloidal dispersions of thin graphite oxide sheets in water.

In practice of an illustrative embodiment of the invention offered for purposes of illustration and not limitation, the bulk graphite oxide is immersed in distilled water in a commercially available ultrasonic cleaning bath (model FS60 from Fisher Scientific Company) for one (1) hour at a frequency of 20 kHz to exfoliate individual graphite oxide nanoplatelets into the water. Such exfoliation achieves graphite oxide nanoplatelets in an amount of about 1 mg/mL of water for purpsoes of illustration. The individual graphite oxide nanoplatelets typically have a platelet thickness of about 1 nm and a major lateral dimension of about 1000 nm and have an irregular platelet shape. The exfoliated platelets can be flat when deposited on a flat surface. Most of the exfoliated graphite oxide nanoplatelets comprise individual graphene oxide sheets in the dispersing medium.

The invention is not limited to making a dispersion of graphite oxide nanoplatelets using the above exfoliation method and can be practiced using other dispersion-forming techniques such as prolonged stirring or other exfoilation techniques.

Pursuant to the invention, the dispersion of the graphite oxide nanoplatelets is subjected to a chemical reduction (chemical deoxygenation) treatment in the presence of a reducing agent and an anionic polymer to remove at least some of the oxygen functionalities from the dispersed graphite oxide nanoplatelets. Partial restoration of the aromatic graphene network and even single graphite sheets (i.e., finite-sized graphene sheets) may be provided via the graphite oxide exfoliation followed by the subsequent solution-based chemical reduction treatment.

Although reduction (deoxygenation) of the water-dispersed graphite oxide nanoplatelets results in a gradual decrease in their hydrophilic character, the presence of the anionic polymer prevents their irreversible agglomeration and precipitation and, instead, permits a stable aqueous dispersion of reduced graphite oxide nanoplatelets to be formed in-situ. A stable dispersion of thin graphitic nanoplatelets in an aqueous dispersing medium thereby can be obtained by the chemical reduction (deoxygenation) treatment pursuant to the invention.

The reducing agent can comprise hydrazine hydrate for aqueous dispersions, N,N-dimethylhydrazine for organic (DMF) dispersions, or other suitable reducing agent effective to achieve deoxygenation of the graphite oxide nanoplatelets.

EXAMPLE 1

Reduction without and with Anionic Polymer Present in Aqueous Dispersion

A stable water dispersion of graphite oxide nanoplatelets was prepared by exfoliation of the graphite oxide (1 mg/mL) via room temperature ultrasonic treatment (Fisher Scientific, FS60, 1 hour and frequency of 20 kHz). The dispersion of graphite oxide nanoplatelets was reduced with hydrazine hydrate as a reducing agent at 100° C. for 24 h. The hydrazine hydrate was added to the dispersion before commencing the heating. Reduction of the graphite oxide nanoplatelets was carried out without an anionic polymer present.

As the reduction (deoxygenation) proceeded, the brown-colored dispersion of exfoliated graphite oxide nanoplatelets turned black in color, and the reduced nanoplatelets agglomerated and eventually precipitated. This precipitated material could not be re-suspended even after prolonged ultrasonic treatment in water in the presence of monmeric surfactants such as sodium dodecylsulfate (SDS) and TRITON X-100 (polyoxyethylene octyl phenyl ether), which have been found to successfully solubilize carbon nanotubes.

Elemental analyses coupled with Karl Fisher titration of both graphite oxide and the reduced graphite oxide material indicate that there was a considerable increase in the C/O atomic ratio in the reduced graphie oxide material (C/O=10.3) compared to that in the starting graphite oxide (C/O=2.7). Hence, the reduced material can be described as consisting of partially oxidized graphitic nanoplatelets, given that a fair amount of oxygen is retained even after reduction. The black color of the reduced materials suggested a partial re-graphitization of the exfoliated graphite oxide. In addition to the decrease in the oxygen level, reduction of graphite oxide was accompanied by nitrogen incorporation from the hydrazine hydrate reducing agent (C/N=16.1).

Water content analysis of the graphite oxide was necessary as graphite oxide is a hygroscopic material, and the water trapped between its layers certainly contributes to the higher oxygen content (water content as high as 25% was measured in the graphite oxide samples). The water content in the reduced graphite oxide material was much lower and was measured to be 2.79% by weight.

Attempts to reduce dispersions of graphite oxide nanoplatelets under similar conditions as described above, but in the presence of SDS or TRITON-X100 monmeric surfactants also failed to produce a stable aqueous dispersion of graphitic nanoplatelets.

However, when the reduction (deoxygneation) was carried out under similar conditions as decribed above in the presence of an anionic polymer pursuant to the invention, a stable black aqueous dispersion of reduced graphite oxide nanoplatelets was obtained.

The polymer used preferably is an amphiphilic polymer such as poly(sodium 4-styrenesulfonate) anionic polymer (hereafter designated PSS) having $M_w$=70000 (available from Sigma-Aldrich). The invention is not limited to practice with PSS polymer and can be practiced with other suitable anionic polymers.

In particular, when the above described reduction was carried out under similar conditions in the presence of PSS having $M_w$=70000 in an amount of 10 mg/mL of the dispersion to provide a weight ratio of 10/1 w/w versus the graphite oxide, a stable black aqueous dispersion of reduced graphite oxide nanoplatelets was obtained. Most of the reduced graphite oxide nanoplatelets comprised individual platelets.

Although the PSS polymeric surfactant binds more strongly to the surface of the nanoplatelets in comparison to the SDS and TRITON X-100 monomeric surfactants, a high concentration of the PSS polymeric surfactant was still needed to prevent precipitation.

The dispersion of reduced graphite oxide nanoplatelets optionally can be filtered through a PVDF [poly(vinylidene difluoride)] membrane (0.2 micrometer pore size, Fisher Scientific) to yield PSS-coated graphitic nanoplatelets that can be re-dispersed readily in water upon mild sonication, forming stable black suspensions. At concentrations lower than 0.1 mg/mL of nanoplatelets, the dispersions obtained after a 30-minute ultrasonic treatment appear to be stable indefinitely; i.e., samples prepared over a year ago are still homogeneous dispersions. More concentrated dispersions can develop a small amount of precipitate after several days. However, they never fully settle, even upon months of standing.

Elemental analysis of the PSS-coated reduced graphite oxide nanoplatelets indicates the platelets contain approximately 40% by weight polymer as judged by its sulfur content (graphite oxide reduced without any PSS contains no sulfur at all). The comparatively high oxygen and hydrogen contents of the platelets are attributed to the water adsorbed by the hygroscopic polymer (12% by Karl Fisher titration). Even drying of the PSS-coated reduced graphite oxide nanoplatelets at 150° C. and 3 mTorr for 24 h failed to alter their elemental composition. The C/O atomic ratio in the reduced graphite oxide platelets alone was thus 9.3 (C/N ratio=22.1), suggesting that a significant reduction (deoxygenation) of exfoliated graphite oxide platelets took place in the presence of the polymer.

That a large concentration of PSS is required to prevent the agglomeration of the platelets during reduction while only a fraction of that amount (<5.8% by weight of the PSS employed is absorbed on the reduced graphite oxide) is needed to render the complex dispersible indicates that the self association between reduced graphite oxide platelets is a more favorable process than their association with PSS (the fraction was based on elemental analysis and the assumption that the polymer nanoplatelet complex is quantitatively isolated). During the reduction, the polymer should be present in a sufficient concentration for its interaction with the surfaces of the platelets to effectively compete with the hydrophobic interaction between the platelets. However, once PSS is attached to the platelet surface, further agglomeration of the platelets is stopped. When reductions were carried out without any PSS, the platelet agglomeration was irreversible: sonication of the reduced material after agglomeration in the presence of excess PSS did not result in platelet dispersion to any extent.

X-Ray photoelectron spectroscopy (XPS) (Omicron ESCA Probe from Omicron Nanotechnology) was employed to analyze the graphite oxide nanoplatelets, the reduced graphite oxide nanoplatelets, and the PSS-coated reduced graphite oxide nanoplatelets. The C 1s XPS spectrum of graphite oxide (FIG. 1a) clearly indicates a considerable degree of oxidation with four components that correspond to carbon atoms in different functional groups: the non-oxygenated ring C (284.8 eV), the C in C—O bonds (286.2 eV), the carbonyl C(C=O, 287.8 eV), and the carboxylate carbon (O—C=O, 289.0 eV).

The presence of these functional groups is further confirmed by the FT-IR spectrum (obtained with a Nexus 870 spectrometer from Thermo Nicolet) of graphite oxide. The most prominent features in the spectrum are the adsorption bands corresponding to the O—H stretching vibrations at 3428 $cm^{-1}$, the C=O carbonyl stretching at 1733 $cm^{-1}$, the phenol C=C ring stretching at 1621 $cm^{-1}$, the phenol O—H deformation vibration at 1412 $cm^{-1}$, the C—O stretching at 1053 $cm^{-1}$, and the C—OH stretching, presumably from phenols, at 1226 $cm^{-1}$.

Figure 1B:
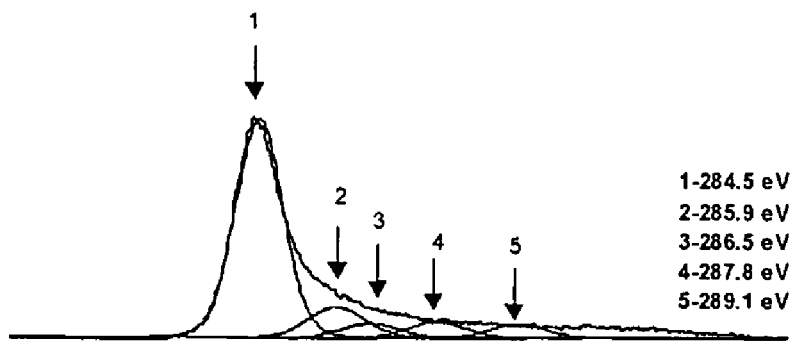
Figure 1C:
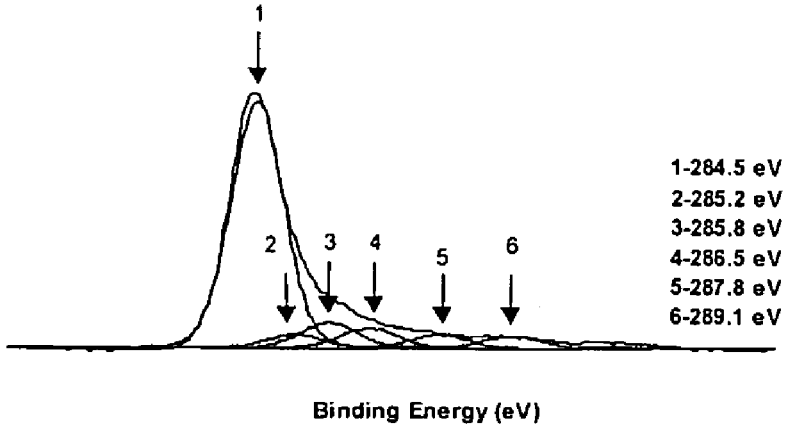

Although the C 1s XPS spectra of the reduced graphite oxide nanoplatelets (FIG. 1b) and the PSS-coated reduced graphite oxide nanoplatelets (FIG. 1c) also exhibit the same oxygen functionalities that have been assigned for graphite oxide, the peak intensities of these components in the reduced samples are much smaller than those in the graphite oxide, indicating considerable de-oxygenation by the reduction process. In addition, there is an additional component at 285.9 eV corresponding to the C in the C=N bonds of hydrazones. Although not wishing to be bound by any theory, it appears likely that hydrazone formation occurs through the reaction of hydrazine with the carbonyl groups of the graphite oxide. The N 1s region in the XPS spectra of these reduced graphite oxide samples also exhibits two N peaks. See: R. J. Waltman, J. Pacansky and C. W. Bates, Jr., Chem. Mater., 1993, 5, 1799-1804.

The C 1s XPS spectrum of the PSS-coated reduced graphite oxide nanoplatelet sample also contains a component peak at 285.2 eV corresponding to the sulfur-bonded carbon atoms from PSS. The XPS survey scan of the PSS-coated reduced graphite oxide sample shows its characteristic peaks at 167.3 eV (S 2p, corresponding to sulfonate), 1071.7 eV (Na 1s), and 495.9 eV (Na KKL). These peaks are entirely absent from the XPS survey scan of the uncoated, reduced graphite oxide nanoplatlets.

Analysis of the C 1s XPS peak intensities indicates a higher level of oxygen for both graphite oxide and each of the reduced samples than those obtained by the elemental analysis of the bulk material. For example, the areas of the four C 1s components of graphite oxide indicate that only 21% of all graphite oxide carbons are unfunctionalized, while for reduced graphite oxide nanoplatelets and the PSS coated reduced graphite oxide nanoplatelets the corresponding values are 75% and 74%. These numbers suggest higher C/O and C/N atomic ratios than the ratios found by elemental analyses.

In addition, analysis of the XPS spectrum of PSS-coated reduced graphite oxide nanoplayields a lower sulfur content (C/S=approx. 36) as compared to bulk elemental analysis (C/S=20.5). Since XPS is a surface-sensitive analytical technique, the disagreement with elemental analysis could arise from a higher degree of oxygenation of the surface of these materials and surface adsorption of various contaminants. Nevertheless, the C 1s XPS spectra clearly show that the reduction of graphite oxide nanoplatelets, with PSS polymer present (FIG. 1b) and without the polymer present (FIG. 1c), resulted in the same oxygen functionalities.

Although not wishing to be bound by any theory, based on available data, the polymer-coated reduced graphite oxide nanoplatelets appear most likely to be comprised of graphitic regions in addition to islands of oxygen- or nitrogen-functionalized carbon atoms.

Figure 2:
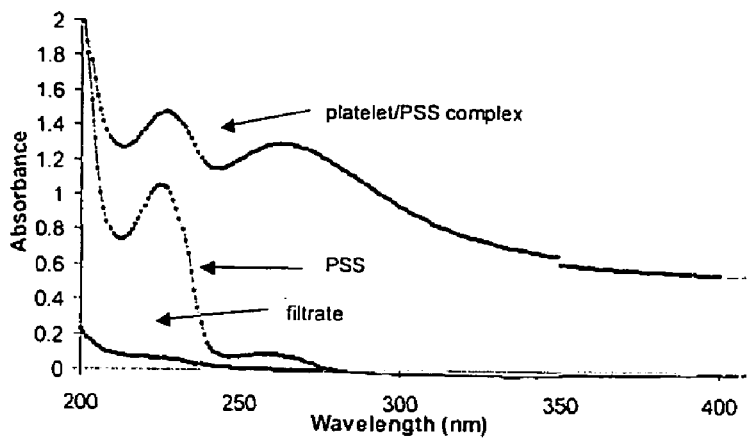
FIG. 2 shows UV-V$_{1s}$ spectra of a stable dispersion of PSS-coated reduced graphite oxide nanoplatelets at 0.03 mg/mL (designated platelet/PSS complex), a solution of PSS at 0.025 mg/mL (designated PSS), and PTFE membrane-filtered filtrate (designated filtrate).

The stable dispersions of polymer-coated reduced graphite oxide nanoplatelets were also analyzed by UV-Vis spectroscopy. The UV-Vis spectrum of the PSS-coated platelet dispersion in water possesses similar features as that of PSS itself (FIG. 2). In the spectrum of the colorless filtrate, obtained by filtration of the PSS-coated platelet dispersion through a PTFE syringe membrane filter (0.45 pm pore size, Fisher Scientific), the intensity of the signal arising from the polymer is very small, indicating that the polymer is strongly attached to the platelet surface (FIG. 2). The small amounts of PSS in the filtrate might be the result of incomplete removal of the excess polymer during the washing step in the synthesis of the polymer-platelet complex, or they might also have been released from the platelet surface during the ultrasonic treatment needed to redisperse the dry polymer-platelet complex into water.

While the IR spectrum of graphite oxide nanoplatelets was quite informative, the FT-IR spectra of reduced, uncoated graphite oxide nanoplatelets and PSS-coated reduced graphite oxide nanoplatelets were dominated by a broad background, making it difficult to identify the surface functionalities of the graphitic component. Independent of sample preparation techniques, the FT-IR spectra of reduced graphite oxide nanoplatelets were essentially featureless, presumably due to the black color of this material. Although the FT-IR spectrum of PSS-coated reduced graphite oxide nanoplatelets exhibits weak PSS absoprtion features, they only confirm the presence of the PSS component.

The visible (532 nm) Raman spectra of the samples were similarly uninformative. The only prominent features for all three samples; namely, graphite oxide nanoplatelets, reduced graphite oxide nanoplatelets, and PSS-coated reduced graphite oxide nanoplatelets, were the well-known D and G bands for the graphitic components. As PSS itself does not exhibit any Raman bands, it does not contribute to the Raman spectra of the PSS-coated reduced graphite oxide nanoplatelets.

Figure 3A:
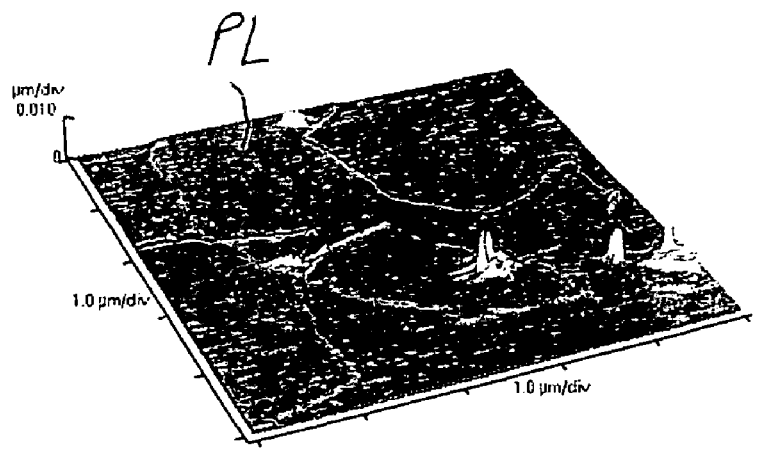
FIGS. 3a and 3b are non-contact atomic force microscope (AFM) images of exfoliated graphite oxide nanoplatelets PL, FIG. 3a, and polymer coated reduced graphite oxide nanoplatelets PL, FIG. 3b.
Figure 3B:
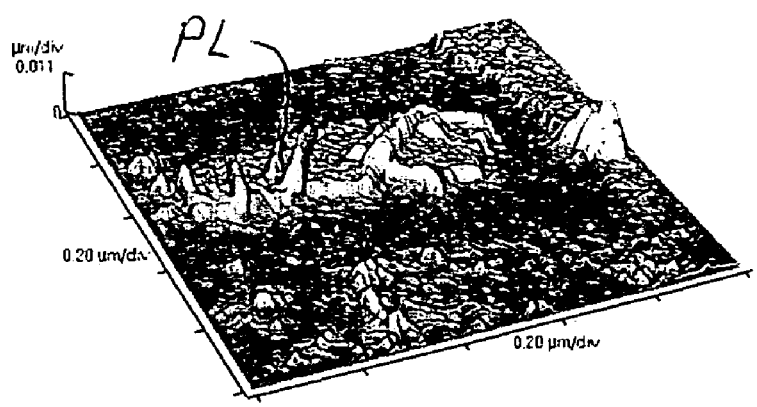

The stable colloidal aqueous dispersion of exfoliated graphite oxide and the stable colloidal aqueous dispersion of PSS-coated reduced graphite oxide were analyzed by atomic force microscopy (AFM) (AutoProbe CP/MT Scanning Probe Microscope (MultiTask), Veeco Instruments). The AFM samples were prepared by depositing these dispersions on mica surfaces and allowing them to air-dry. The AFM image of the exfoliated graphite oxide revealed nanoplatelets PL with uniform thickness (approx. 1 nm) (such as shown in FIG. 3a). In the case of PSS-coated reduced graphite oxide, nanoplatelets with a thickness of approx. 4 nm were observed (FIG. 3b).

In practice of another illustrative embodiment of the invention offered for purposes of illustration and not limitation, the bulk graphite oxide prepared as described above is treated with an organic isocyanate prior to exfoliation. The isocyanate-treated graphite oxide then can be exfoliated in a polar aprotic solvent to provide a stable dispersion of functionalized graphene oxide nanoplatelets. The invention is not limited to making a dispersion of functionalized graphite oxide nanoplatelets using the above exfoliation method and can be practiced using other dispersion-forming techniques such as prolonged stirring or other exfoilation techniques.

Pursuant to the invention, the dispersion of the functionalized graphite oxide nanoplatelets is subjected to a chemical reduction (chemical deoxygenation) treatment in the presence of a reducing agent and a polymer to remove at least some of the oxygen functionalities from the dispersed graphite oxide nanoplatelets. Partial restoration of the aromatic graphene network and even single graphite sheets (i.e., finite-sized graphene sheets) may be provided via the graphite oxide exfoliation followed by the subsequent solution-based chemical reduction treatment. A stable dispersion of thin functionalized graphitic nanoplatelets in an organic dispersing medium thereby can be obtained by the chemical reduction (deoxygenation) treatment pursuant to the invention.

EXAMPLE 2

Reduction of Isocyanate Treated Platelets in Organic Dispersion

Graphite oxide was prepared from purified natural graphite (SP-1, Bay Carbon, Mich., average particle size 30 μm) by the above-discussed Hummers method and dried for a week over phosphorus pentoxide in a vacuum desiccator before use. The isocyanate 4-isocyanatobenzenesulfonyl azide was prepared from 4-carboxybenzenesulfonyl azide via a published procedure described by L. Ibarra et al. in article entitled "Effect of a diazide as adhesive agent in elastomeric matrix-short polyamide fibers composite" in J. Appl. Polym. Sci., 1993; 48,(3); 375-381, the teachings of which are incorporated herein by reference. All other isocyanates used in this Example were purchased from Sigma-Aldrich and used as received. All solvents were HPLC grade and were purchased from Fisher Scientific. Anhydrous NN-dimethylformamide (DMF) was obtained from a Dow-Grubbs solvent system installed by Glass Contours (Laguna Beach, Calif.) and described by AB Panghorn et al. in Organometallics; 1996; 15(5); 1518-1520, the teachings of which are incorporated herein by reference. All manipulations with this solvent were performed using standard Schlenk techniques.

AFM images were taken on an AutoProbe CP/MT Scanning Probe Microscope (MultiTask from Veeco Instruments). Imaging was done in non-contact mode using a V-shape "Ultralever" probe B (Park Scientific Instruments, B-doped Si with frequency f=78.6 kHz, spring constants k=2.0-3.8 N/m, and nominal tip radius r=10 nm). All images were collected under ambient conditions at 50% relative humidity and 23° C. with a scanning raster rate of 1 Hz. AFM images were obtained by depositing dispersions of functionalized graphite oxides on a freshly cleaved mica surface (obtained from Ted Pella Inc., Redding, Calif.).

Dynamic light-scattering (DLS) measurements were performed on a Brookhaven Instruments Corp. photon correlation spectrometer (BI-200 SM goniometer) fitted with a Brookhaven Instruments BI-9000AT digital correlator and a 300-mW argon ion laser at 514 nm. The scattering angle used was 90°. A refractive index-matching bath of filtered decalin (0.2 µm) surrounded the scattering cell, and the temperature was fixed at 25° C. Correlation data were fitted using the method of cumulants described by DE Koppel et al. in J. Chem Phys 1972; 57(11); 4814-4820, the teachings of which are incorporated herein by reference to the logarithm of the correlation function, yielding the diffusion coefficient, D.

The hydrodynamic diameters (d) of the nanoparticles were calculated using D and the Stokes-Einstein equation ($D=K_B T/3\pi n d$, where $K_B$ is the Boltzmann constant, T is the absolute temperature, n is the solvent viscosity, and d is the diameter of the particle). The polydispersity factor of the nanoparticles, represented as $\mu_2/\Gamma^2$, where $\mu_2$ is the second cumulant of the decay function and $\Gamma$ is the average characteristic line width, was calculated by the cumulant method. CONTIN algorithms were used in the Laplace inversion of the autocorrelation functions to confirm particle size distributions. All analyses were performed with the supplied instrument software. For the DLS measure-ments, the stable dispersions of phenyl isocyanate-treated graphite oxide were prepared at 1 mg/mL and then diluted 1000 times.

FT-IR spectra (KBr) were collected with a Thermo Nicolet Nexus 870 instrument and the spectral features were assigned using the KnowltAll Informatics System Academic Edition 5.0 software (obtained from Bio-Rad Laboratories, Inc.). Elemental analyses were performed by Atlantic Microlab (Norcross, Ga.).

Preparation of isocyanate-treated graphite oxides (iGOs) in a typical procedure involved steps wherein graphite oxide (50 mg) was loaded into a 10 mL round-bottom flask equipped with a magnetic stir bar and anhydrous DMF (5 mL) was then added under nitrogen to create an inhomogeneous suspension. The organic isocyanate (2 mmol) was next added and the mixture was allowed to stir under nitrogen for 24 h. (In the case of solid isocyanates, both the isocyanate and graphite oxide were loaded into the flask prior to adding DMF.) After 24 hours, the slurry reaction mixture was poured into methylene chloride (50 mL) to coagulate the product. The product was filtered, washed with additional methylene chloride (50 mL), and dried under vacuum.

A Fisher Scientific FS60 ultrasonic bath cleaner (150 W) was used to prepare dispersions of functionalized graphite oxides in DMF and attempts to prepare dispersions in water.

In testing, a dispersion of isocyanate-treated graphite oxide nanoplatelets in DMF was prepared by exfoliation of the isocyanate-treated graphite oxide (1 mg/mL) via room temperature ultrasonic treatment (Fisher Scientific, FS60, 1 hour and frequency of 20 kHz). After a brief ultrasonic treatment as described above, the isocyanate-treated graphite oxide (iGO) readily forms stable colloidal dispersions in polar aprotic solvents such as DMF, N-methylpyrrolidone (NMP), dimethyl sulfoxide (DMSO), and hexamethylphosphoramide (HMPA). Other less polar solvents, such as tetrahydrofuran (THF), acetone, methylene chloride, and toluene, or common polar protic solvents, such as methanol and ethanol, did not disperse the iGO materials.

Also, the isocyanate-treated GO (iGO) does not disperse at all in water.

The dispersions of the phenyl isocyanate-treated GO in DMF at 1 mg/mL concentration made by the ultrasonic treatment were examined in vials. The dark brown dispersion of the phenyl isocyanate-treated graphite oxide nanoplatelets in DMF contained no visible precipitate after 24 hours and was stable for weeks.

Figure 4:
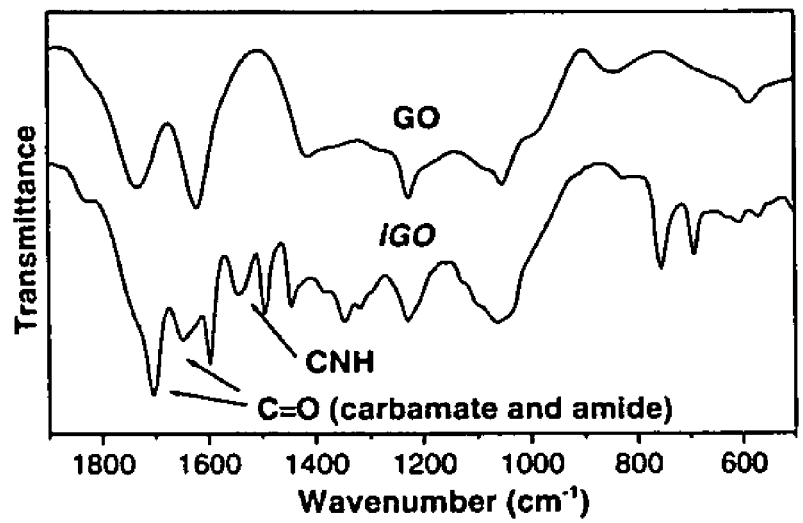
FIG. 4 shows the FT-IR spectra of graphite oxide (GO) and phenyl isocyanate-treated graphite oxide (iGO).

The treatment of graphite oxide (GO) with organic isocyanates can lead to the derivatization of both the edge carboxyl and surface hydroxyl functional groups via formation of amides or carbamate esters, respectively. The chemical changes occurring upon treatment of GO with isocyanates can be observed by FT-IR spectroscopy as both GO and its isocyanate-treated derivatives display characteristic IR spectra. FIG. 4 illustrates the changes occurring in the FT-IR spectrum of GO upon treatment with phenyl isocyanate. The most characteristic features in the FT-IR spectrum of GO are the adsorption bands corresponding to the C=O carbonyl stretching at 1733 $cm^{-1}$, the O—H deformation vibration at 1412 $cm^{-1}$, the C—OH stretching at 1226 $cm^{-1}$, and the C—O stretching at 1053 $cm^{-1}$. Besides the ubiquitous O—H stretches which appear at 3400 $cm^{-1}$ as a broad and intense signal (not shown), the resonance at 1621 $cm^{-1}$ can be assigned to the vibrations of the adsorbed water molecules, but may also contain components from the skeletal vibrations of un-oxidized graphitic domains.

Upon treatment with phenyl isocyanate, the C=O stretching vibration at 1733 $cm^{-1}$ in GO becomes obscured by the appearance of a stronger absorption at 1703 $cm^{-1}$ that can be attributed to the carbonyl stretching vibration of the carbamate esters of the surface hydroxyls in iGO. The new stretch at 1646 $cm^{-1}$ can be assigned to an amide carbonyl-stretching mode (the so-called Amide I vibrational stretch). The new band at 1543 $cm^{-1}$ can originate from either amides or carbamate esters and corresponds to the coupling of the C—N stretching vibration with the CHN deformation vibration (the so-called Amide II vibration). Significantly, the FT-IR spectra of iGOs do not contain signals associated with the isocyanate group (2275-2263 $cm^{-1}$), indicating that the treatment of GO with phenyl isocyanate results in chemical reactions and not mere absorption/intercalation of the organic isocyanate.

Assuming that the formation of the carbamate esters via the reaction of the isocyanate with the surface hydroxyls is the exclusive reaction pathway, the carbon-to-nitrogen atomic ratio in iGO can be used to calculate an approximate functionalization degree. Table 1 shows calculated degrees of functionalization for different iGO expressed as the number of graphene carbons per one incorporated carbamate ester unit.

TABLE 1

Calculated functionalization degrees for different isocyanate-treated GOs

| Entry | Isocyanate[a] | Graphene-C/N ratio |
|---|---|---|
| 1 | phenyl isocyanate (Ph–NCO) | 15.7 (8.7[b]) |
| 2 | tert-butyl isocyanate ((CH$_3$)$_3$C–NCO) | 20 |
| 3 | cyclohexyl isocyanate | 16 |
| 4 | n-pentyl isocyanate | 18.3 |
| 5 | 4-cyanophenyl isocyanate (NC–C$_6$H$_4$–NCO) | 12.4 |
| 6 | 4-acetylphenyl isocyanate (CH$_3$CO–C$_6$H$_4$–NCO) | 7.6 |
| 7 | 4-azidosulfonylphenyl isocyanate (N$_3$O$_2$S–C$_6$H$_4$–NCO) | 16.1 |

[a]Reaction conditions: GO (50 mg), and isocyanate (2 mmol) in anhydrous DMF (5 mL), 24 h.
[b]Reaction time was 7 days.

It is noted that these calculated numbers comprise the lower limits of functionalization; for exclusive amide formation, the calculated functionalization degrees would be higher since there is a loss of carbon (as carbon dioxide) from the isocyanate reagent.

The extent of functionalization with different isocyanates appears to correlate with their relative reactivities. For example, for the sterically hindered tert-butyl isocyanate, one carbamate unit is incorporated for every 20 graphene carbons (Table 1, entry 2), while for the more reactive 4-acetylphenyl isocyanate there is one carbamate unit for every 7.6 graphene carbons (Table 1, entry 6). Under the same conditions, exposure to phenyl isocyanate affords a graphene carbon/carbamate ratio of 15.7. However, prolonged treatment can lead to further functionalization with one carbamate unit incorporated for every 8.7 graphene carbons. This chemistry is quite general for a variety of isocyanates, including those containing reactive functionalities (Table 1, entries 5-7). Hence, isocyanate treatment can be used to engender a plethora of functional groups on GO nanoplatelets, not only for tailoring surface properties, but also for further chemical modifications. As such, iGOs that have been functionalized with carbonyl, cyano, and azidosulfonyl groups (Table 1, entries 5-7) can be used for the covalent linking of GO nanoplatelets to a variety of materials containing complementary reactive functional groups to afford new nanostructures.

In the case of phenyl isocyanates possessing a second reactive functional group that can also react with the surface hydroxyls, crosslinking of the adjacent GO layers occurs and the corresponding iGO derivatives do not exfoliate well. For instance, GO treated with phenyl isocyanates bearing p-chloromethyl or p-chlorosulfonyl functional groups did not exfoliate at all in DMF. In addition, the exfoliated iGO obtained by using 4-isocyanatophenyl isothiocyanate would gradually, over several weeks, precipitate in DMF. An isolated sample of 4-isocyanatophenyl isothiocyanate-treated GO would eventually lose its ability to be re-dispersed in DMF. Although isothiocyanates react with hydroxyl groups much slower than isocyanates, interlayer crosslinking occurs over time, even in the solid state and re-dispersion is prevented.

As the functionalization degree of GO can be controlled via either the reactivity of the isocyanate or the reaction time, it should be possible to prepare graphene oxide nano-platelets with partial isocyanate functionalization and then subject them to a second chemical treatment to functionalize the remaining hydroxyls. In this way, graphene oxide nanoplatelets with two or more different surface functionalities can be readily produced. For instance, reaction of GO that has been partially functionalized with phenyl isocyanate (1 carbamate unit/15.7 graphene carbons) with an excess of 4-cyanophenyl isothiocyanate for 24 hour results in further functionalization of the remaining hydroxyls and incorporation of the nitrile functionalities on the surface of the nanoplatelets as was evident by FT-IR (see ESI). Based on elemental analysis, one cyanide-functionalized carbamate unit was incorporated for every 23.3 graphene carbons, bringing the overall functionalization degree to 9.4.

Figure 5:
FIG. 5 is a non-contact AFM image of nanoplatelets PL deposited on a mica surface from a dispersion of phenyl isocyanate-treated graphite oxide nanoplatelets in DMF with lines 1 and 2 representing lines along which height profiles are taken and shown in FIGS. 5a and 5b, respectively. The small dot-like structures on the surface of the mica surface are attribiuted to particles of inorganic salts that are leftovers from the preparation of GO.
Figure 5A:
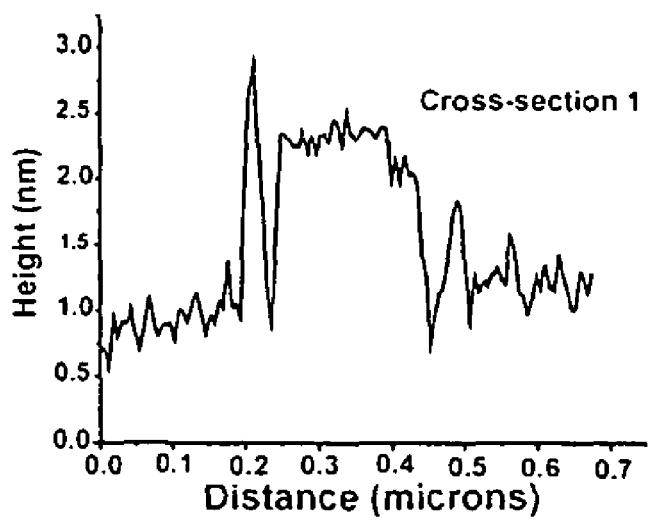
Figure 5B:
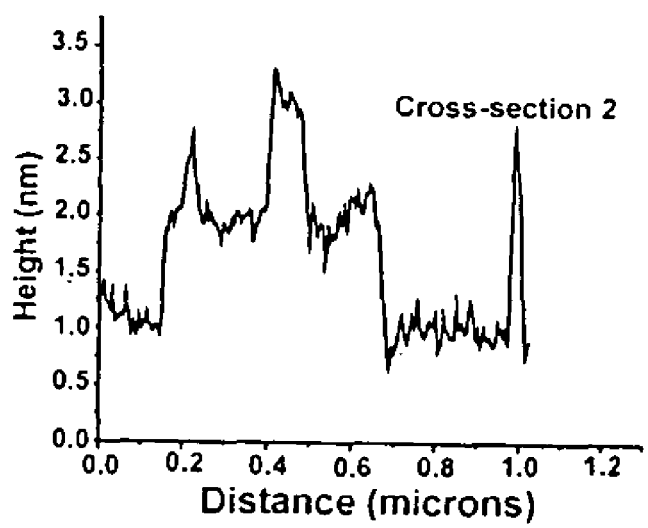

The level of exfoliation of iGO in DMF, chosen for its lowest boiling point among the polar aprotic solvents employed that form a stable dispersion with iGO (vide supra), was evaluated using AFM in a non-contact mode. In all cases, the corresponding AFM images show that iGO samples underwent complete exfoliation in DMF and that the dispersions contain platelets that are about 1 nm thick almost exclusively. FIG. 5 shows the example of phenyl isocyanate-treated GO nanoplatelets PL; several other iGO specimens were also analyzed by AFM, exhibiting nanoplatelets that are uniformly about 1 nm thick. This observed thickness of exfoliated iGO platelets in DMF is essentially the same as the thickness observed in Example 1 for platelets exfoliated in water, suggesting that while the isocyanate treatment of GO leads to chemical functionalization of the surface of the platelets (vide supra), it results in no increase in their thickness detectable by AFM. This is consistent with the incomplete functionalization of the graphene carbon sites (for the p-acetylphenyl isocyanate-functionalized nanoplatelets, which has the highest degree of functionalization (Table 1, entry 6), there is one amide or carbamate moiety per every four graphene rings). Such isolated subnanometer features on the platelet surface are unlikely to be detected in a routine AFM experiment, especially since the GO platelets can also contain adsorbed solvent molecules on their surface. While the pristine graphene sheet is flat with a well-known van der Waals thickness of about 0.34 nm, the graphene oxide sheets are expected to be thicker due to the presence of covalently bound oxygen and the displacement of the sp$^3$-hybridized carbon atoms slightly above and below the original graphene plane. From XRD experiments, the intersheet distance for graphite oxide varies with the amount of absorbed water, with values such as 0.63 nm and 0.61 nm reported for "dry" GO samples (complete drying of GO is probably impossible) to 1.2 nm for hydrated GO. If these values represent the "thickness" of an individual GO layer, given that all platelets in our iGO materials observed by AFM are of the same thickness (about 1 nm) and that either thicker or thinner platelets PL are never detected, applicants believe that these represent fully exfoliated, chemically functionalized graphene oxide sheets, although applicants do not intend to be bound by any theory in this regard. Based on the AFM data, the nanoplatelets appear to be highly varied in both shapes and sizes.

Dynamic light scattering (DLS) was also employed to obtain a rough measure of the lateral size distributions in the exfoliated samples of phenyl isocyanate-treated GO (referred to as piGO, FIG. 6). As this analysis assumes spherical shapes and the piGO platelets are more accurately described as 2-D objects, the average platelet diameter that is reported from DLS (560±60 nm with a polydispersity index of 0.80±0.14) is not their average dimension but rather the effective hydrodynamic diameter of an equivalent sphere described by the tumbling of the platelets. Additionally, even though the piGO platelets appear rigid when deposited on an atomically flat surface (for the AFM experiment), in reality they are highly pliant sheets that easily conform to any features on that surface. As such, their exact morphology in solution is not known. Nevertheless, one can still infer that the size distribution of the piGO platelets as being highly polydisperse, consistent with the AFM data.

The formation of carbamate esters upon treatment of GO with isocyanates removes the ability of the surface hydroxyls and edge carboxyl groups to engage in hydrogen bonding, thus rendering graphene oxide sheets less hydrophilic and hence more compatible with the polar aprotic solvents than with water. Noteworthy is the fact that exfoliation of iGO in polar aprotic solvents does not require complete derivatization of all the surface hydroxyls in GO. Even iGOs with a lower degree of functionalization (such as the tert-butyl isocyanate-treated GO) exfoliate easily in polar aprotic solvents. In addition to a decrease in the density of surface hydroxyl groups, the addition of hydrocarbon substituents via isocyanate treatment weakens the hydrogen bonding between adjacent layers in GO, thus allowing for their exfoliation in polar aprotic solvents. As expected, the functionalization of GO with hydrocarbon containing isocyanate leads to an increased surface hydrophobicity in the resulting iGOs, reduces the hydration of the remaining hydroxyl groups, and prevents the exfoliation of the iGO sheets in water.

This Example demonstrates that treatment of GO with organic isocyanates results in a new class of iGO materials possessing reduced hydrophilic properties which can be exfoliated in polar aprotic solvents to yield derivatized graphene oxide nanoplatelets. This is the first demonstrated example of complete exfoliation of chemically derivatized graphite oxide in organic solvents. In addition, the use of isocyanates containing orthogonal functionalities such as cyano, keto, and azidosulfonyl allows for further modification of the surface properties and chemistry of iGO.

EXAMPLE 3

Composite Formation

This Example demonstrates preparation of composites reinforced by graphene sheets incorporated and homogeneously distributed into various polymer matrices. The preparation of graphene-polymer composites is conducted by molecular-level dispersion of individual, chemically modified graphene sheets within organic polymer hosts.

This Example describes preparation of electrically conductive graphene-polymer nanocomposites prepared by solution phase mixing of the exfoliated phenyl isocyanate-treated graphite oxide sheets with polystyrene followed by chemical reduction of the phenyl isocyanate-treated graphite oxide sheets. These composites feature individual graphene sheets well dispersed throughout the polymer matrix. Similar dispersions have been achieved with other styrenic polymers such as acrylonitrile-butadiene-styrene and styrene-butadiene rubbers. Chemical reduction was essential for inducing electrical conductivity, as composite samples with un-reduced phenyl isocyanate-treated graphite oxide sheets were insulating. In addition, the presence of the polymer in solution during the reduction step was key to preventing the agglomeration of the sheets. As the reduction proceeds, the sheets become coated with the polymer and remain individually dispersed. When the reduction step preceded the introduction of the polymer, significant agglomeration of graphene sheets occurred. Further details of the preparation and fabrication of composite samples are now described.

Graphite oxide was prepared by the above-discussed Hummers method from SP-1 graphite (Bay Carbon), and dried for a week over phosphorus pentoxide in a vacuum desiccator. Dried graphite oxide (50 mg) was suspended in anhydrous DMF (5 ml, Dow-Grubbs solvent system), treated with phenyl isocyanate (2 mmol, Sigma-Aldrich) for 24 hours, and recovered by filtration through a sintered glass funnel (50 ml, medium porosity).

Stable dispersions of the resulting phenyl isocyanate-treated graphite oxide materials were prepared by ultrasonic exfoliation (Fisher Scientific FS60, 150 W, 1 h) in DMF (1 mg/mL) as described above.

Polystyrene (from Scientific Polymer Products, approximate MH, =280 kD, PDI=3.0) was added to these dispersions and dissolved with stirring.

Reduction of the dispersed material was carried out with dimethylhydrazine reducing agent (0.1 ml in 10 ml of DMF, Sigma-Aldrich) at 80° C. for 24 hours. Upon completion, the coagulation of the polymer composites was accomplished by adding the DMF solutions dropwise into a large volume of vigorously stirred methanol (10:1 with respect to the volume of DMF used).

The coagulated composite powder was isolated via filtration; washed with methanol (200 mL); dried at 130° C. under vacuum for about 10 hours to remove residual solvent, antisolvent, and moisture; crushed into a fine powder with a mortar and pestle, and then pressed in a hydraulic hot press (Model 0230C-XI, PHI-Tulip) at 18 kN with a temperature of 210° C.

To convert wt % loading of functionalized, reduced graphene sheets in the composite samples to vol. % (as used below), a density for the phenyl isocyanate-treated graphite oxide sheets of 2.2 g/cm$^3$ was assumed along with the known density of polystyrene, 1.05 g/cm$^3$. Composites of acrylonitrile-butadiene-styrene and styrene-butadiene rubbers (Sigma-Aldrich) were similarly prepared using the appropriate copolymers.

AFM images were taken on an AutoProbe CP/MT scanning probe microscope (MultiTask from Veeco Instruments). Imaging was done in non-contact mode using a V-shaped 'Ultralever' probe B (Park Scientific Instruments, boron-doped Si with frequency $f_c$=78.6 kHz, spring constants k=2.0-3.8 N m$^{-1}$, and nominal tip radius 10 nm). All images were collected under ambient conditions at 50% relative humidity and 23° C. with a scanning raster rate of 1 Hz. Samples for AFM images were prepared by depositing dispersions of functionalized graphite oxide in DMF on a freshly cleaved mica surface (from Ted Pella Inc.) and allowing them to dry in air.

Electron micrographs were acquired using a field emission SEM (LEO 1525) and a TEM (JEM-3010, JEOL, operated at 300 kV). Two SEM imaging conditions were used: 'surface imaging' operating at less than or equal to 1 kV, and 'subsurface imaging' at greater than or equal to 5 W. Microtomed and cast film samples were prepared for TEM. Pressed composites were microtomed to slices of 40-60 nm thickness (Leica Ultracut UCT, Reichert Inc.) and dropped onto standard TEM grids. Samples investigated in this way were 0.24, 1.44 and 2.4 vol. % graphene sheets loading in the composite. A polystyrene control sample was also prepared and imaged in this way. Before imaging with TEM, SEM was used to verify that a sufficient amount of highly dispersed platelets were present. Cast-film samples were prepared to image graphene sheets 'lying flat' on the carbon support film, with the beam incident along the [0001] direction of the graphene sheet. A small amount (<0.01 mg) of un-pressed powder composite was dissolved in toluene (10 mL) together with additional polystyrene (<0.02 mg) as diluent. The solution was sonicated (Crest Ultrasonic Tru-Sweep 175HT, 45 W, 1 h) before casting, producing a highly dilute solution that, when cast on a mica substrate, formed a film approximately 40 nm thick, as measured by AFM.

Figure 8A:
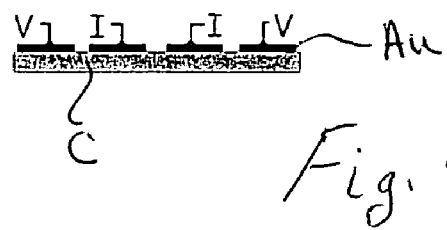
FIGS. 8a and 8b are diagrams showing the four-probe setup for in-plane and transverse conductivity measurements, respectively, of a sample of composite C.
Figure 8B:
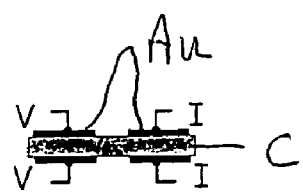
Figure 8C:
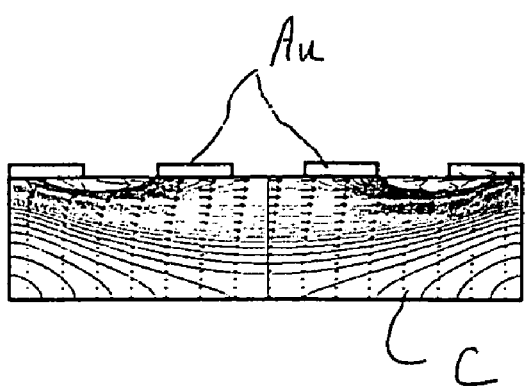
FIG. 8c shows one of the computed (FEMLAB) distributions of magnitude of the current density (contour lines) and local direction and magnitude (arrows) in a sample for the following conditions: the sample thickness is twice the electrode width and the gap between them, and the in-plane resistivity is 10 times lower than the transverse resistivity.

Electrical measurements were made on sample of hot-pressed composite C, FIGS. 8a, 8b, and 8c. Hot-pressed composite samples having 0.3-0.5 mm thickness were cut into strips (1-2 mm wide and 15-20 mm long). A thin 'skin' layer deficient in the phenyl isocyanate-treated graphite oxide nanoplatelets was removed by oxygen plasma etching (Plasma-Preen 11-862, Plasmatic Systems; 2 torr OZ, 1.5 min, 350 W) to reduce the contact resistance between the metal leads L and sample tested. After etching, a thin gold (Au) film (about 25 nm thick) was thermally deposited (BOC Edwards Auto 306 Evaporation System) on one side of the sample for 'longitudinal' measurements (gap between contacts was 0.15 mm), FIG. 8a, and on the top and bottom sides for 'transverse' measurements, FIG. 8b. The d.c. resistance of the composites was measured with a d.c. power supply (HP6612C), digital multimeter (HP34401A) and picoammeter (Keithley 6485) using a standard four-probe technique with a threshold detection limit of 0.1 GO.

At 2.4 volume percent (vol. %) loading of the functionalized, reduced graphene sheets, the composite appears in SEM images to be almost entirely filled with the graphene sheets, even though 97.6 vol. % is still filled by the polymer (FIGS. 7a and 7b of fractured test composite). This 'visual' effect is due to the enormous surface area of the sheets. The specific surface area of an individual graphene sheet is about 2,600 m²/g, so 1 µm³ of a composite with 1 vol. % graphene sheets would have about 50 µm² of sheet surface area. SEM image analysis was used to estimate the apparent graphene sheet surface area at different concentrations. It revealed a surface area lower by roughly a factor of two than the calculated values for each concentration. The nanoscale corrugation of the graphene sheets (not evident in SEM imaging) may contribute to the discrepancy.

FIGS. 7c and 7d are SEM images of a fractured test composite having 0.48 volume percent (vol. %) loading of the functionalized, reduced graphene sheets The potential properties of the graphene sheet-based composites appear promising owing to the extremely high aspect ratios of the sheets as determined from SEM images (FIG. 7a, 7b), in which the average lateral dimension was estimated to be about 1 µm, similar to the values found by AFM. However, in contrast to the typically flat sheets seen by AFM when deposited onto atomically flat substrates, the sheets in the composites are crumpled and wrinkled, and at times folded after incorporation in the composite. Heat treatment of such composites to 300° C., well above the glass transition temperature of polystyrene (100° C.), does not result in agglomeration of the graphene sheets (as assessed from extensive SEM imaging), suggesting their thermal stability over a broad temperature range.

As SEM cannot spatially resolve the thickness of an individual graphene-based sheet, transmission electron microscopy (TEM) was used to determine if the graphene-based sheets were indeed present in the composites as single, exfoliated sheets or as multi-layered platelets. Extensive high-resolution phase-contrast imaging showed no evidence of multi-layer stacks, even though SEM of the same slices clearly indicated the presence of nanoplatelets. In contrast, selected area electron diffraction (SAED) of composite samples yielded spot patterns matching those expected for individual graphene-based sheets. SAED of pure polystyrene samples fabricated in an identical manner showed the ring pattern expected for an amorphous material.

The conductive nature of the graphene filler motivated the study of the percolation behaviour of the composites through electrical measurements. As a control, polystyrene composites containing phenyl isocyanate-treated graphite oxide sheets that were not chemically reduced were prepared. At similar graphene concentrations, these samples were greyish in colour compared to the almost black composites filled with the reduced graphene oxide material, and they were not electrically conductive.

To obtain the true value of the conductivity of the composites, applicants made separate measurements of in-plane and transverse resistances (FIGS. 8a, 8b) and developed a numerical simulation program based on FEMLAB (version 3.1, Comsol AB), which takes into account geometry of the samples and electrical leads. All measurements and subsequent analysis revealed minor anisotropy, with the in-plane conductivity, $\sigma_{pl}$, always slightly higher than the transverse conductivity, $\sigma_{tr}$.

A rapid increase in the direct current electrical conductivity of composite materials takes place when the conductive filler forms an infinite network of connected paths through the insulating matrix. When the filler particles are rigid bodies, the conductivity of such media is typically described with a bond percolation model. The conductivity of the composite, $\sigma_c$, above the percolation threshold is then treated with a power law:

$$\sigma_c = \sigma_f [(\Phi - \Phi_c)/(1 - \Phi_c)]^t$$

where $\sigma_f$ is the conductivity of the filler, $\Phi$ is the filler volume fraction, $\Phi_c$ is the percolation threshold (the onset of the transition), and t is the 'universal critical exponent'. The power law is described in J. Polm. Sci., 43; 3273-3287 (2005).

Percolation in polystyrene-graphene composites occurs when the filler concentration is near 0.1 vol. % (FIGS. 8-1, 8-2). This percolation threshold is, to the best of applicants' knowledge, about three times lower than reported for any other two-dimensional filler. Such a low percolation threshold for a three-dimensional isotropic case is evidently due to the extremely high aspect ratio of the graphene sheets and their excellent homogeneous dispersion in these composites. Randomly oriented oblate ellipsoids (disks) with an aspect ratio of 1,000 are predicted to have a geometric percolation threshold of about 0.1 vol. %. At a loading of about 0.15 vol. %, the conductivity of the composites of this Example already satisfies the antistatic criterion ($10^{-6}$ S/M) for thin films and rapidly rises over a 0.4 vol. % range. An increase in graphene sheet loading above 0.5 vol. % yields a more gradual increase in electrical conductivity, with values of about 0.1 S/m at 1 vol. % and about 1 S/m at 2.5 vol. %.

The electrical properties of the composites of this Example compare well with the best values reported in the literature for nanotube-polymer composites. The percolation threshold of around 0.1 vol. % is almost the same as was achieved for single-wall carbon nanotube (SWNT)-polystyrene composites made by latex technology, and just twice and four times higher than those measured for SWNT-polyimide and poly(phenyleneethynylene)-functionalized SWNT-polystyrene composites, respectively.

Absolute conductivities of the graphene-polystyrene composites of this Example are essentially the same as the values reported for SWNT-filled polystyrene composites, which involve thin film composites. In contrast, the test samples of this Example are made by a quasi-industrial method (e.g. samples made by hot-pressing-also samples made by injection moulding show similar values of electrical conductivity). Furthermore, graphene sheets have higher surface-to-volume ratios than SWNTs owing to the inaccessibility of the inner nanotube surface to polymer molecules. This makes graphene sheets potentially more favourable for altering all matrix properties-such as the mechanical, rheological and permeability properties, and degradation stability. Also, SWNTs are still much more expensive than graphite, which is a commodity material with about 1,000,000 tons used annually, and which is sold for a few US dollars per kilogram. In contrast, graphite oxide can be readily prepared from a vast array of graphites, and its industrial production has also recently become a topic of interest.

Although the invention has been described in detail with respect to certain embodiments, those skilled in the art will appreciate that the invention is not limited to these embodiments and that changes, modifications and the like can be made therein with departing from the spirit and scope of the invention as set forth in the appended claims.

REFERENCES

1. H. Fukushima and L. T. Drzal, Anna. Tech. Conf. Soc. Plast. Eng., 2003, 61, 2230-2234.
2. B. T. Kelly, Physics of Graphite, Applied Science, London, 1981, 475 pp.
3. (a) H. He, T. Riedl, A. Lerf and J. Klinowski, J. Phys. Chem, 1996, 100, 19954-19958; (b) H. He, J. Klinowski, M. Forster and A. Lerf Chem. Phys. Lett., 1998, 287, 53-56; (c) A. Lerf, H. He, M. Forster and J. Klinowski, J Phys. Chem. B, 1998, 102, 4477-4482; (d) C. HontoriaLucas, A. J. Lopez-Peinado, J. d. D. Loepz-Gonzalez, M. L. RojasCervantes and R. M. Martin-Aranda, Carbon, 1995, 33, 1585-1592.
4. (a) M. Hirata, T. Gotou, S. Horiuchi, M. Fujiwara and M. Ohba, Carbon, 2004, 42, 2929-2937; (b) M. Hirata, T. Gotou and M. Ohba, Carbon, 2005, 43, 503-510; (c) G. I. Titelman, V. Gelman, S. Bron, R. L. Khalfin, Y. Cohen and H. Bianco-Peled, Carbon, 2005, 43, 641-649.
5. (a) A. B. Bourlinos, D. Goumis, D. Petridis, T. Szabo, A. Szeri and I. Dekany, Langrnuir, 2003, 19, 6050-6055; (h) U. Hofmann and A. Frenzel, Kolloid Z, 1934, 68, 149-151.
6. (a) P. Liu and K. Gong, Carbon, 1999, 37, 706-707; (b) U. Hofmann and E. Konig, Z Anorg. Aug Client., 1937, 234, 311-336.
7. V. C. Moore, M. S. Strano, E. H. Haroz, R. H. Hauge, R. E. Smalley, J. Schmidt and Y. Talmon, Nano Lett., 2003, 3, 1379-1382.
8. D. Briggs and G. Beamson, High Resolution XPS of Organic Polymers: The Scienta ESCA300 Database, John Wiley & Sons Inc, New York, 1992, 266 pp.
9. J. Robertson, in Graphite and Precursors, ed. P. Delhaes, Gordon and Breach Publishers, Amsterdam, 2001, p. 257.
10. C. A. Hunter, K. R. Lawson, J. Perkins and C. J. Urch, J. Chem. Soc., Perkin Trans. 2, 2001, 651-669.

We claim:

1. A method of making a dispersion of reduced graphite oxide nanoplatelets, comprising:
    a) providing a dispersion of isocyanate-treated graphite oxide nanoplatelets in a dispersing medium by exfoilating nanoplatelets from isocyanate-treated graphite oxide in the dispersing medium using ultrasonic energy, and
    b) reducing the isocyanate-treated graphite oxide nanoplatelets in the dispersing medium in the presence of a reducing agent and a polymer in the dispersing medium wherein the polymer coats the reduced graphite oxide nanoplatelets to reduce aggolmeration and retain the dispersion over time.

2. The method of claim 1 wherein graphite oxide is treated with phenyl isocyanate prior to exfoliation in the dispersing medium.

3. A method of, making a dispersion of reduced graphite oxide nanoplatelets, comprising:
    a) providing a dispersion of isocyanate-treated graphite oxide nanoplatelets by exfoilating nanoplatelets from isocyanate-treated graphite oxide in a dispersing medium using ultrasonic energy, and
    b) reducing the graphite oxide nanoplatelets in the dispersion in the presence of a reducing agent and a polymer.

4. The method of claim 3 wherein the exfoliated nanoplatelets comprise isocyanate-treated graphene oxide nanosheets.

5. The method of claim 1 wherein the dispersing medium is an organic liquid.

* * * * *